US010677501B2

(12) United States Patent
Moghaddam et al.

(10) Patent No.: US 10,677,501 B2
(45) Date of Patent: Jun. 9, 2020

(54) COMPONENT AND EFFICIENT PLATE AND FRAME ABSORBER

(71) Applicant: University of Florida Research Foundation, Inc., Gainesville, FL (US)

(72) Inventors: Saeed Moghaddam, Gainesville, FL (US); Mehdi Mortazavi, Gainesville, FL (US); Sajjad Bigham, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 142 days.

(21) Appl. No.: 15/762,333

(22) PCT Filed: Sep. 26, 2016

(86) PCT No.: PCT/US2016/053748
§ 371 (c)(1),
(2) Date: Mar. 22, 2018

(87) PCT Pub. No.: WO2017/053955
PCT Pub. Date: Mar. 30, 2017

(65) Prior Publication Data
US 2019/0072303 A1 Mar. 7, 2019

Related U.S. Application Data

(60) Provisional application No. 62/232,052, filed on Sep. 24, 2015.

(51) Int. Cl.
*F25B 37/00* (2006.01)
*F28F 13/18* (2006.01)
(Continued)

(52) U.S. Cl.
CPC .............. *F25B 37/00* (2013.01); *F25B 15/06* (2013.01); *F28F 3/027* (2013.01); *F28F 13/182* (2013.01);
(Continued)

(58) Field of Classification Search
CPC . F25B 37/00; F25B 15/06; F28F 3/027; F28F 2245/02; F28F 13/182; Y02A 30/277; F28D 2021/0064; Y02B 30/62
(Continued)

(56) References Cited

U.S. PATENT DOCUMENTS 5,127,234 A * 7/1992 Woods, Jr. .............. F25B 15/02
62/101
2003/0159806 A1 * 8/2003 Sehmbey ............ F28D 15/0233
165/80.3
(Continued)

FOREIGN PATENT DOCUMENTS

JP 2007-255860 A 10/2007
JP 2008-202824 A 9/2008
(Continued)

OTHER PUBLICATIONS

International Searching Authority, International Search Report for Application No. PCT/US2016/053748, dated Dec. 14, 2016, 3 pages, Korean Intellectual Property Office, Republic of Korea.
(Continued)

*Primary Examiner* — Steve S Tanenbaum
(74) *Attorney, Agent, or Firm* — Alston & Bird LLP

(57) ABSTRACT

An absorber for an absorption refrigeration system for a vertically mounted plate absorber has fins positioned over the plate to promote distribution of a fluid under flow as a nearly continuous thin film. The absorber has rows of fins that are evenly spaced with the fins occupying a portion of the active width of the plate with adjacent rows offset by the
(Continued)

width of the plate. A combined evaporator-absorber module is constructed with the absorbing face of the absorber parallel with an evaporating surface of an evaporator where absorber solution and refrigerant fall as parallel falling sheets of liquid. The absorber is covered with a porous hydrophobic membrane to isolate the falling absorber solution from the falling liquid refrigerant.

20 Claims, 16 Drawing Sheets

(51) Int. Cl.
*F28F 3/02* (2006.01)
*F25B 15/06* (2006.01)
*F28D 21/00* (2006.01)

(52) U.S. Cl.
CPC .. *F28D 2021/0064* (2013.01); *F28F 2245/02* (2013.01); *Y02A 30/277* (2018.01); *Y02B 30/62* (2013.01)

(58) Field of Classification Search
USPC .......................................................... 62/271
See application file for complete search history.

(56) References Cited

U.S. PATENT DOCUMENTS

2014/0238072 A1   8/2014   Moghaddam
2015/0184876 A1   7/2015   Vandermeulen et al.

FOREIGN PATENT DOCUMENTS

| WO | WO 2013/063210 A1 | 5/2013 |
| WO | WO 2015/095356 A1 | 6/2015 |
| WO | WO 2015/103199 A1 | 7/2015 |
| WO | WO 2015/187667 A1 | 12/2015 |

OTHER PUBLICATIONS

Mortazavi et al., *Compact and Efficient Generator for Low Grade Solar and Waste Heat Driven Absorption Systems*, Elsevier, Applied Energy, vol. 198 (2017), pp. 173-179.

\* cited by examiner

COMPONENT AND EFFICIENT PLATE AND FRAME ABSORBER

CROSS-REFERENCE TO RELATED APPLICATIONS

This application is the U.S. national stage application of International patent application no. PCT/US2016/053748, filed Sep. 26, 2016, which claims the benefit of U.S. Provisional Application Ser. No. 62/232,052, filed Sep. 24, 2015, the disclosures of which are hereby incorporated by reference in their entireties, including all figures, tables and drawings.

This invention was made with government support under DE-AR0000133 awarded by the Department of Energy. The government has certain rights in the invention.

BACKGROUND OF INVENTION

Vapor compression systems (VCSs) are the most widely used cooling systems for refrigeration, air conditioning, and heat pumps. VCSs consume significant electrical energy and their potential environmental impact has prompted development of more eco-friendly alternative technologies. In contrast to VCSs, absorption refrigeration systems (ARSs) utilize low-grade thermal energy and use eco-friendly refrigerants, such as water. ARSs are often used in large-scale applications where a thermal energy source or excess heat from a process is available. Presently, ARSs are not economically competitive with the VCSs in small-scale applications due to their high initial cost. If high performance, inexpensive, and robust ARSs could be developed, they could play a significant role in the future energy economy.

One of the main components of an ARS that has a significant impact on its size, cost, and performance is the absorber heat exchanger. In an absorber, the refrigerant molecules are absorbed into an absorbent by an exothermic condensation from vapor to liquid. Additional heat is generated due to interactions between the refrigerant and absorbent molecules. The generated heat must be removed from the absorbent to perpetuate the absorption process. In existing systems, a falling film is utilized to generate a significant vapor-absorbent interface and to facilitate heat removal from the absorbent as it falls on a cold surface. Since heat is generated at the vapor-solution interface and must transfer through the solution film to reach the cold surface, the liquid film thickness plays a major role in the absorption process. A thick solution film displays significant mass transfer resistance as the refrigerant molecules diffuse through the solution.

Enhancement of the absorption rate and development of scalable absorber configurations have been intensively studied. Falling film absorption processes over vertical walls, horizontal and vertical tube banks, and helical coiled tube configurations have been numerically and experimentally examined. Falling films over a horizontal tube bank is the arrangement commonly implemented in existing large-scale systems. To develop compact absorbers, alternative configurations have been explored. Most recently, the efficacy of the membrane-based absorption process and its scalability have been demonstrated. Nasr et al., "Absorption characteristics of lithium bromide (LiBr) solution constrained by superhydrophobic nanofibrous structures", *Int J Heat Mass Transf,* 2013; 63, 82-90 reports absorption rates 2.5 times higher than that of the conventional falling film absorbers. Bigham et al., "Moving beyond the limits of mass transport in liquid absorbent microfilms through the implementation of surface-induced vortices," *Energy* 2014; 65, 621-30, numerically shows enhancement in the membrane-based absorption process can be achieved through generation of vortices within the flow through implementation of micro-scale features on the flow channel wall. The vortices change the mass transfer mode within the solution from diffusive to advective transfer. Nevertheless, non-membrane based absorbers that have high efficiencies remain a goal for ARSs, particularly absorber designs suitable for the plate-and-frame absorber configurations.

BRIEF SUMMARY

An embodiment of the invention is directed to an absorber for an absorption refrigeration system, comprising a plate with an array of fins projecting perpendicularly from the plate's surface. The fins are uniformly spaced in parallel rows over the vertical surface with fins occupying half of the width of an active area of the plate. The fins project a surface perpendicular to the plate's surface. Adjacent, for example, the ultimate and penultimate rows, have fins offset by the lance length, or width, of the fins. These fins distribute a falling liquid over the active area of the plate as a continuous thin falling film of liquid when the plate is positioned vertically with the rows of fins parallel to a base of the plate. The fins can be rectangular, extending from the plate's surface. The fins can be in an offset-strip fin array having a continuous surface connecting the fins of an ultimate row projecting outward from the vertical surface with a continuing parallel sheet to the fins of an antepenultimate row projecting inward to the vertical surface. In an embodiment of the invention, it is advantageous for the active area of the plate to have a hydrophilic surface, such as an oxidized and hydroxylized metal surface. In other embodiments of the invention, the surface is that of a hydrophilic polymer or a hydrophilic polymer bound surface.

In an embodiment of the invention, the absorber can be combined with an evaporator into a combined evaporator-absorber module. The absorber and the evaporator are situated where an evaporation plate for heat transfer and distribution of a refrigerant is parallel to the active area on the plate of the absorber. A porous hydrophobic membrane separates the absorber and the evaporator. In an embodiment of the invention, the combined evaporator-absorber module can have two absorbers contact a common cooling conduit situated between two evaporators.

In an embodiment of the invention, an absorption refrigeration system includes the absorber. In another embodiment of the invention, an absorption refrigeration system includes a combined evaporator-absorber.

DETAILED DISCLOSURE

An embodiment of the invention is directed to absorbers having a 3D surface structure installed on a vertical flat plate. The absorber design produces a uniform solution film to minimize film thickness and to continuously interrupt the boundary layer. An embodiment of the invention is directed to an ARS comprising the absorber with the 3D surface structure. The effects of various operating parameters such as water vapor pressure, solution flow rate, solution inlet concentration, cooling water inlet temperature and solution inlet temperature on the absorption rate are studied.

The absorber, according to an embodiment of the invention overcomes the drawbacks of conventional falling film technology due to maldistribution of the absorbent film over the cooled surface. Maldistribution is undesirable flow patterns resulting in high liquid accumulation at some areas while leaving other areas unwetted. The non-wetted areas do not participate in the absorption process and result in significant reduction in effective absorption surface area, particularly at low flow rates. Increasing the flow rate shrinks the unwetted areas leading to a more effective implementation of the available surface area until the surface is fully wetted at a relatively high solution flow rate that results in a thick solution film. It is arguable that an increase in the solution flow rate beyond the fully wetted state does not lead to a greater absorption rate due to heat transfer limitations.

Figures 1A, 1B:
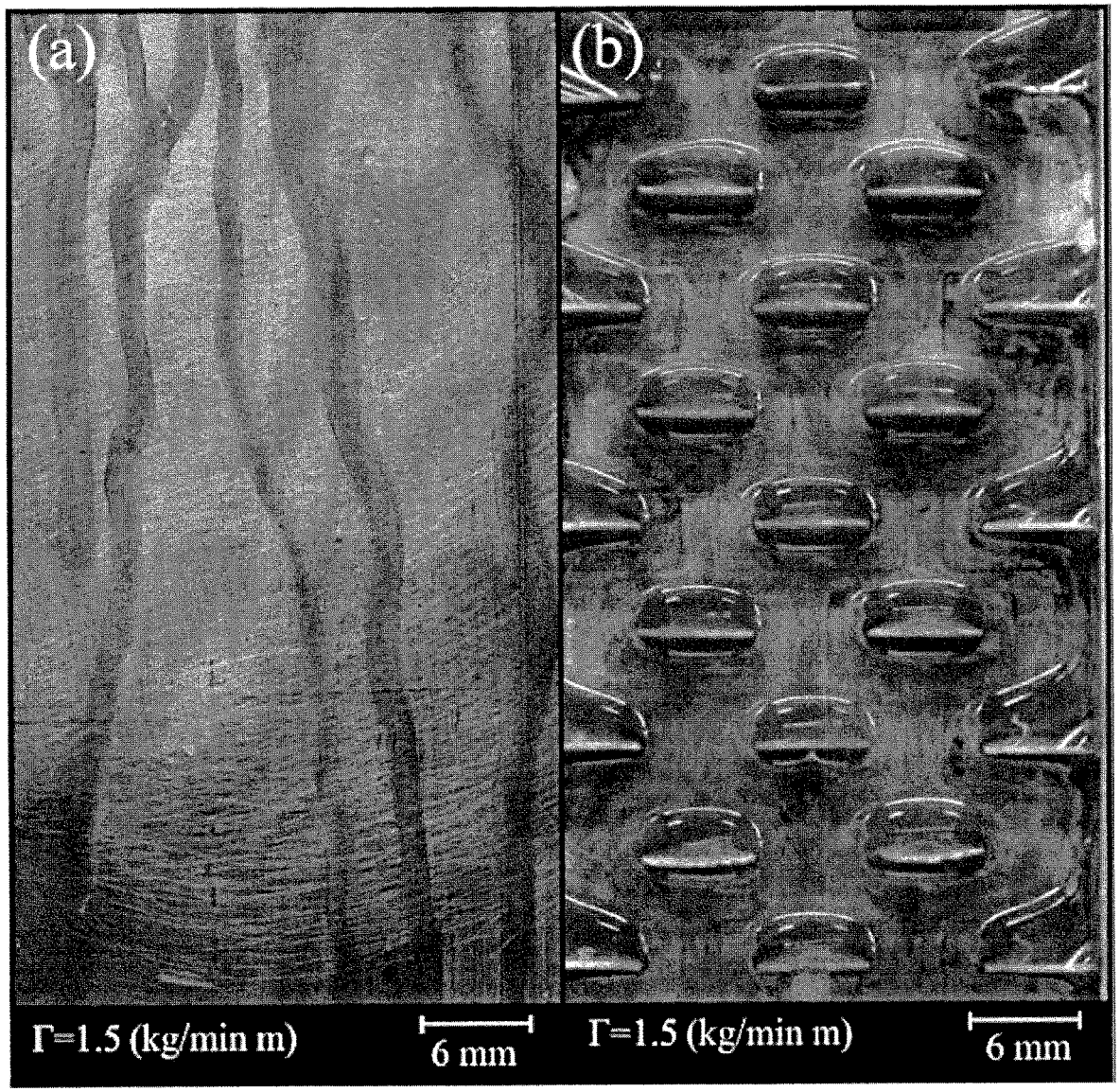
FIG. 1A shows a photograph of the flow distribution of an aqueous solution over a flat surface and FIG. 1B shows a photograph of the flow distribution of an aqueous solution over a patterned surface.

The absorber, according to an embodiment of the invention, overcomes the problems of a thick solution film by patterning the cooling surface with spatially ordered fins that achieve the fully wetted state at a significantly lower solution flow rate where the absorption process is not thermally limited. As a result, the absorption rate continues to increase beyond the fully wetted state. As shown in FIG. 1, a simple staggered array of rectangular fins affects the flow pattern and the resulting contact area between the fluid and the cooling surface, the substrate. The rivulet flow regime, characterized by distinct flow streams FIG. 1A, is exhibited by a liquid falling over a flat vertical wall. In contrast, the flow is transformed into the continuous film regime when the wall is patterned with surface features, as shown in FIG. 1B. In embodiments of the invention, the absorber has an array of structures optimized to yield desired flow characteristics. In embodiments of the invention, the fin elements of the array are located sufficiently close to each other for providing the desired effect on the flow, but yet are situated sufficiently far from each other to ensure that capillary force does not dominate flow. At low spatial separation of fins, the capillary force leads to filling the surface structure and forming a thick liquid film on the wall. At higher separation, the effect of the structures is diminished and individual flow streams form. At a given flow rate, there is an optimum value for the spatial distance that optimizes formation of a thin and continuous liquid film over the surfaces. To optimize the fin array design, a numerical simulation was conducted that focused on the flow dynamics with an objective of defining geometric and flow parameters to ensure a uniform flow distribution.

Simulations were carried out with the pressure-based finite volume scheme using the commercial CFD package FLUENT. To track the liquid and vapor volume fractions in each cell of the entire computational domain, a volumeconserved technique, VOF (Volume of Fluid) method, was employed. A convection equation calculates the liquid volume fraction, $\alpha_l$, as:

$$\frac{\partial}{\partial t}(\alpha_l \rho_l) + \vec{v} \cdot \nabla(\alpha_l \rho_l) = 0 \quad (1)$$

where $\rho_l$ is the liquid density. Since the volume fraction values do not uniquely identify the interface between the phases, an interface reconstruction scheme must be evoked. A piecewise linear geometric reconstruction scheme available in FLUENT was employed to update the volume fraction values in each cell. Pressure-velocity coupling is achieved using the SIMPLE algorithm. An important factor that impacts the capillary force acting at the meniscus formed between the fins is the surface wettability. Surface-wettability is characterized by the contact angle defined at the triple line where the three phases meet. The contact angle can influence the flow pattern and thus the interfacial contact areas.

Figure 2:
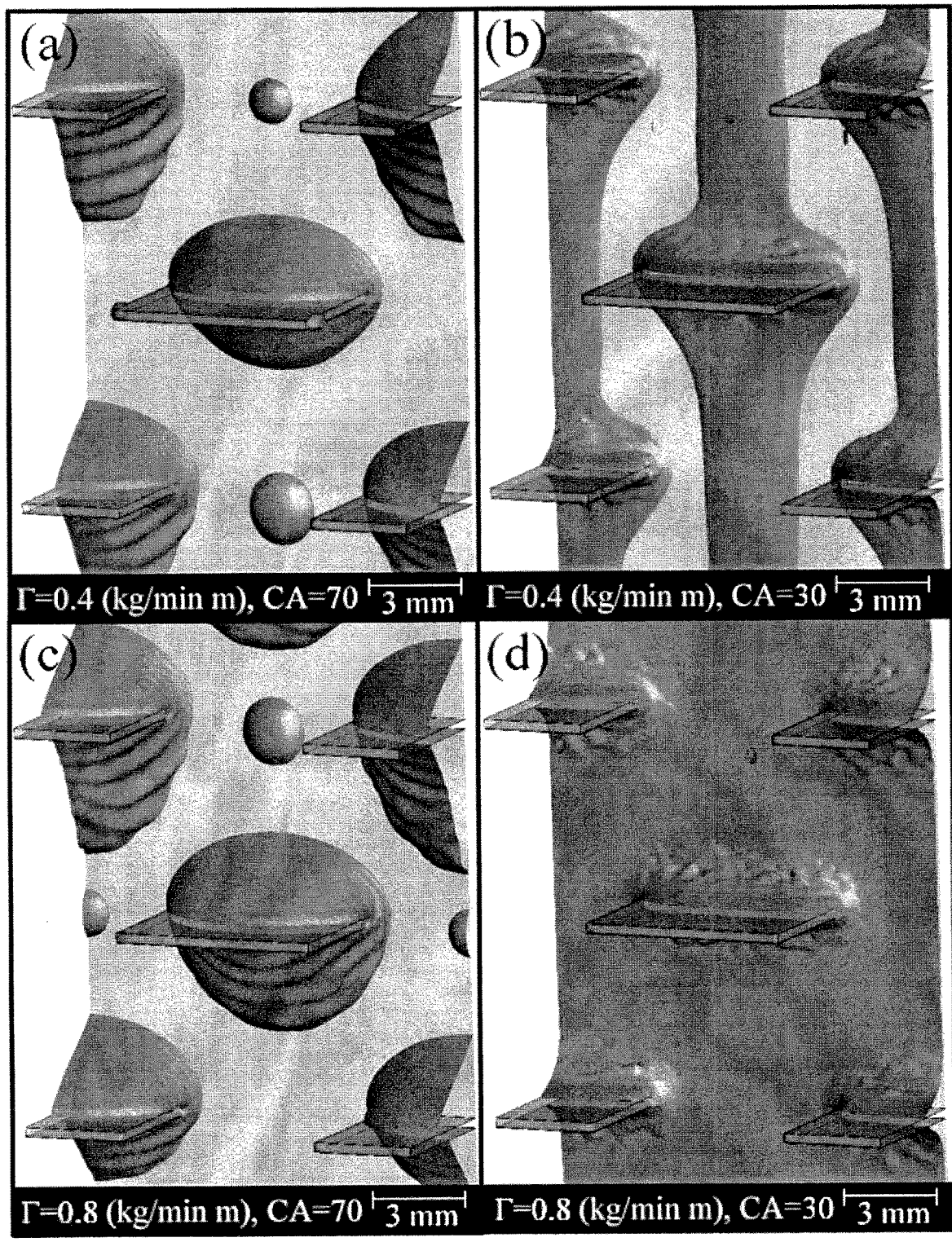
FIGS. 2A-D show simulated flow patterns at different contact angles and flow rates for absorbers with flat fins.

Numerical simulations indicate the contact angle influence on the flow pattern. FIG. 2 shows flow patterns predictions by the numerical model for aqueous LiBr solution (55 wt % LiBr) flow in the fin array with surfaces of different contact angle and at various flow rates. Inspection of FIG. 2 reveals the patterns for surfaces with contact angles of 70° and 30° at a constant flow rate. As illustrated in FIGS. 2A and 2B, flow patterns that are discontinuous drops occur on a 70° surface, where most fluid accumulates around the fin structures, but a discontinuous rivulet mode with multiple flow streams forms on a 30° surface. For each surface, there is a threshold flow rate to achieve a fully wetted regime where individual flow streams coalesce to form a continuous falling liquid film. As the contact angle decreases, the fully wetted regime occurs at a lower flow rate and has a thinner film. For example, at a contact angle of 70°, no continuous film is observed, as shown in FIGS. 2A and 2C, whereas on surfaces of 30° contact angle, after a flow rate of about 0.5 kg/min m, as implied in FIGS. 2B and 2D, a continuous thin film forms, which is a significantly lower flow than that of conventional falling films.

FIG. 3A shows a photograph of an absorber heat exchanger unit, according to an embodiment of the invention, having a fin structure. The fins assembled in the unit are an offset-strip fin, which is easily fabricated via sheet metal forming techniques, unlike the machined patterned surface shown in FIG. 1B. The offset-strip fins project outward from the vertical surface continuing parallel to the vertical surface and inward to the vertical surface. The offset-strip fin array has a continuous surface where the fins of an ultimate row project outward from the vertical surface with a continuing parallel sheet and a repeating length, defined as the pitch, to the fins of an antepenultimate row where the surface projects inward to the vertical surface. The penultimate rows are constructed with fins that are likewise projecting outward and are likewise connected to the fin projecting inward and are displaced from the ultimate row by half the pitch. As the simulation results indicated, at the flow rates used for establishing the thin continuous films, liquid does not flow over the fins. Therefore, the front faces of the offset-strip fin do not participate in the flow dynamics of the surface. Consequently, there is no significant difference between the flow characteristics of a rectangular fin array, as in FIG. 1B, and the equivalent offset-strip fin, according to an embodiment of the invention, as shown in FIG. 3B, which is significantly simpler to fabricate. The fin structure is rotated by 90° with respect to the flow direction, as opposed to the configuration adopted in a typical heat exchanger.

Figure 3:
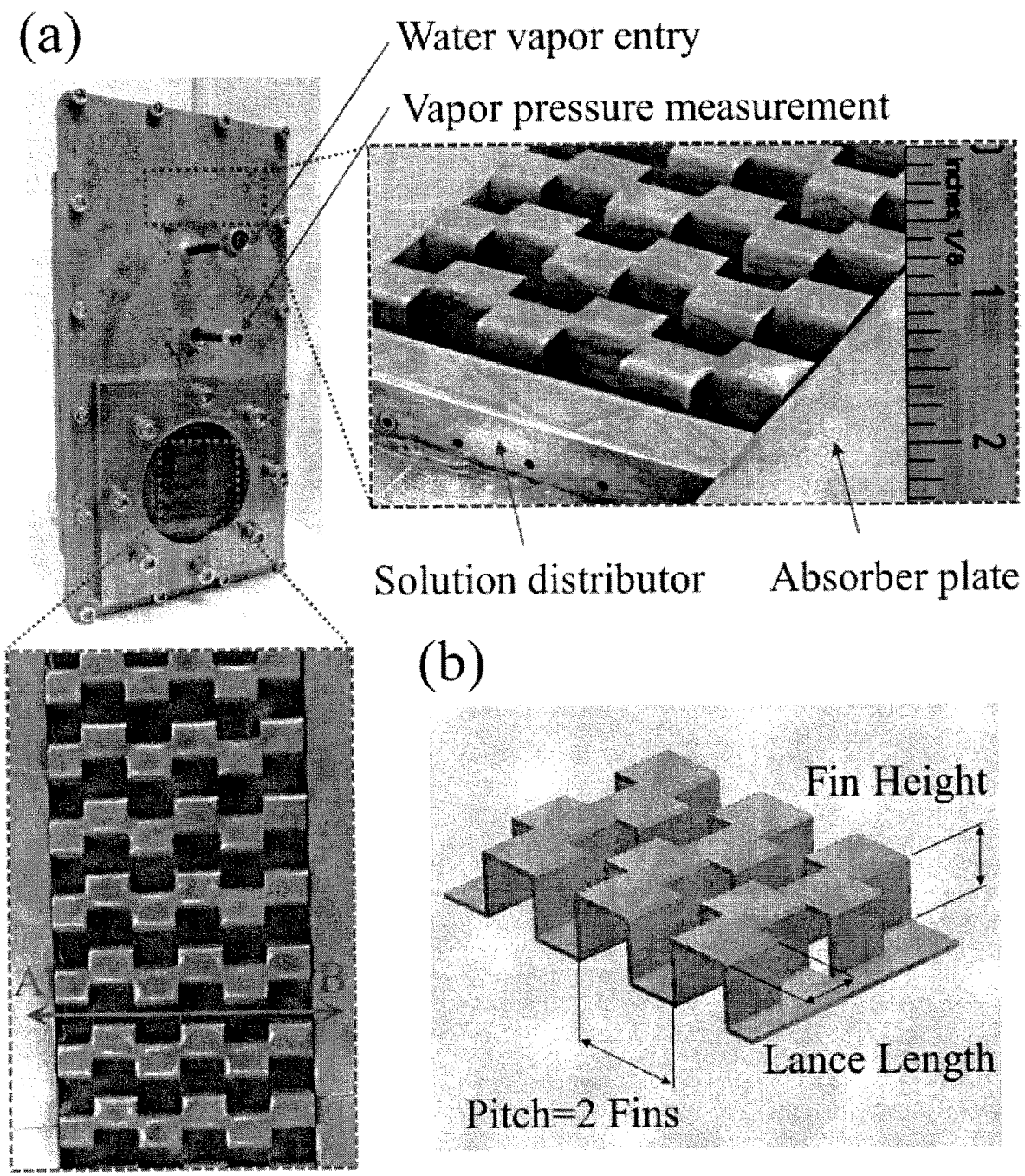
FIG. 3A illustrates an absorber heat-exchanger and subsections thereof, according to an embodiment of the invention, and FIG. 3B displays the lanced offset fin geometry of the absorber, according to an embodiment of the invention.

The fin array is bonded onto the bottom face of a rectangular cavity machined in the absorber plate. Unlike the case of the rectangular fin array shown in FIG. 1B, where the base surface is flat, the offset-strip fins, according to embodiments of the invention, as shown in FIG. 3B, have surface elevation varied by the fin thickness, which is approximately 150 μm, in the exemplary embodiment. This thickness non-uniformity is significantly smaller than the overall fin spacing and the liquid film follows the surface contour. In the exemplary absorber heat exchanger unit, the solution distributor comprises six cylindrical holes with a diameter of 1 mm and a length of 6.35 mm that is bonded to the bottom of the cavity at the absorber inlet. The overall dimensions of the absorber are 152×304 $mm^2$ with an active finned area of 38×170 $mm^2$ for the exemplary unit. The exemplary unit included a glass window on the front wall of the absorber to allow optical access of the fin structure for performing solution film thickness measurements. The geometrical details of the fin are provided in FIG. 3. The exemplary fin is formed from copper sheets to have a thickness 0.15 mm, with lanced length, fin height, and pitch of 6.35 mm, 6.35 mm and 11.6 mm, respectively.

Figure 4A:
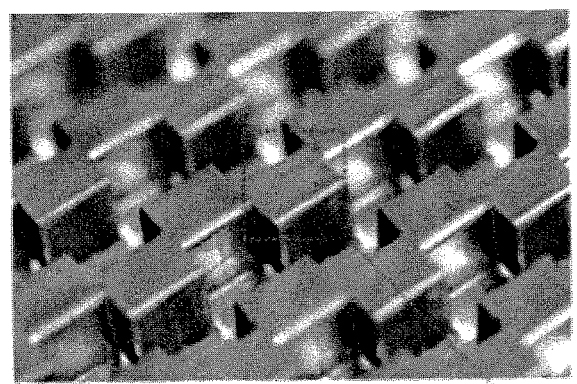
FIG. 4A shows photographs of a portion of the absorber, where the untreated surface of the absorber has a hydrophobic surface as shown in the accompanying water drop, according to an embodiment of the invention.
Figure 4A:
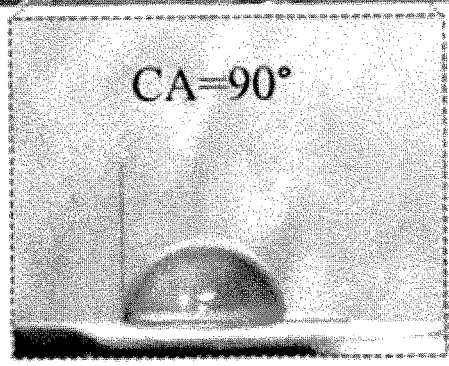
Figure 4B:
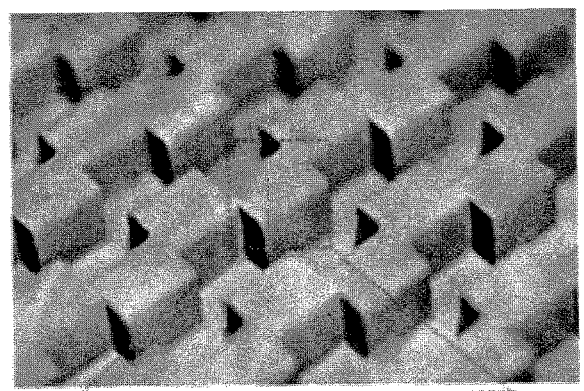
FIG. 4B shows photographs of a portion of the absorber, where the treated surface of the absorber has a hydrophillicc surface as shown in the accompanying water drop, according to an embodiment of the invention.
Figure 4B:
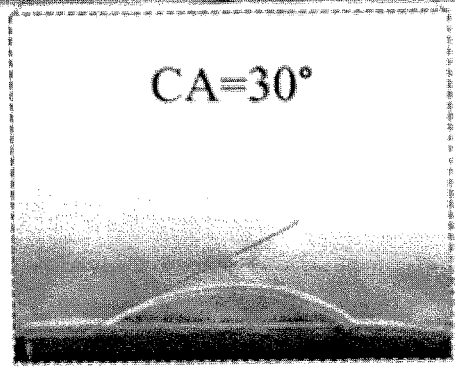

The wetting characteristics of the fin structure have a significant effect on distribution and uniformity of the solution film. For absorbers, according to an embodiment of the invention, higher surface wettability allows better fluid spreading behavior. To optimize wettability, fins are surface treated physically and chemically to render the fins as hydrophilic as possible. Fins of the exemplary absorbers were sandblasted with fine aluminum oxide particles to form a microscale surface roughness followed by 5 hours of surface oxidation/hydroxylation in boiling water. As a result, the LiBr solution contact angle on the fin surface was reduced from 90° to 30°, as shown in FIGS. 4A and 4B. In other embodiments of the invention, the surface is that of a hydrophilic polymer or a hydrophilic polymer bound surface. The surfaces include those that contain, but are not limited to, hydroxyl, polyethylene oxide, amide, amine, and ionic groups.

Figure 5:
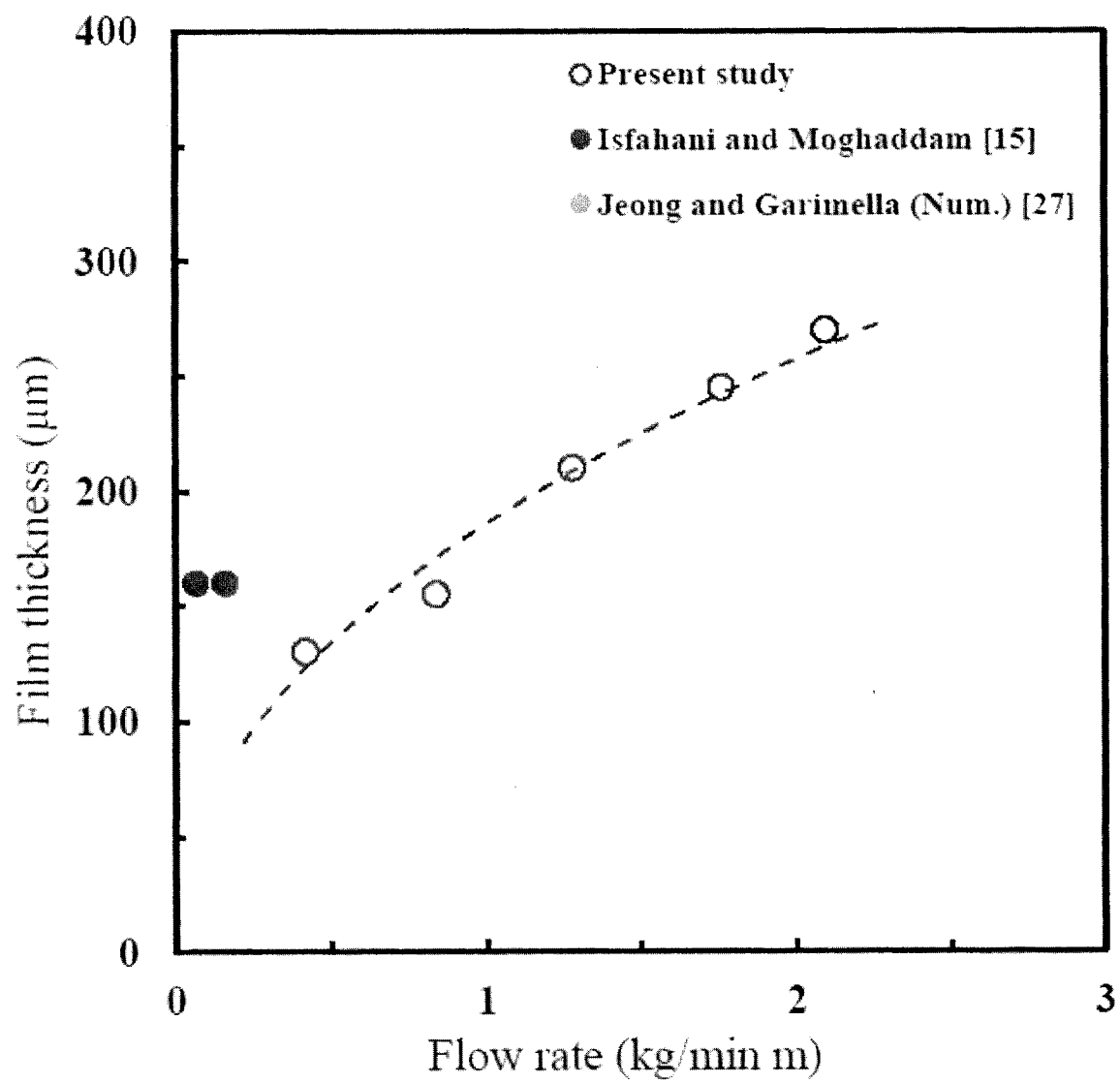
FIG. 5 shows a plot of solution film thickness as a function of flow rate for the absorber, according to an embodiment of the invention, and comparative data from Isfahani and Moghaddam, *Int J Heat Mass Transf* 2013, 63,82-90 and Jeong and Garimella, *Int J Heat Mass Transf* 2002, 45, 1445-58.

The absorption process can be thermally limited at high solution flow rates due to formation of a thick solution film. However, a solution film thickness of a few hundred microns does not thermally limit the absorption process. For the absorber, according to an embodiment of the invention, as shown in FIGS. 4A and 4B, thickness measurements for different solution flow rates are plotted in FIG. 5. As evident in FIG. 5, solution film thickness remains within a few hundred microns over the flow rate range of less than 0.5 to more than 2 kg/min m.

Figure 6:
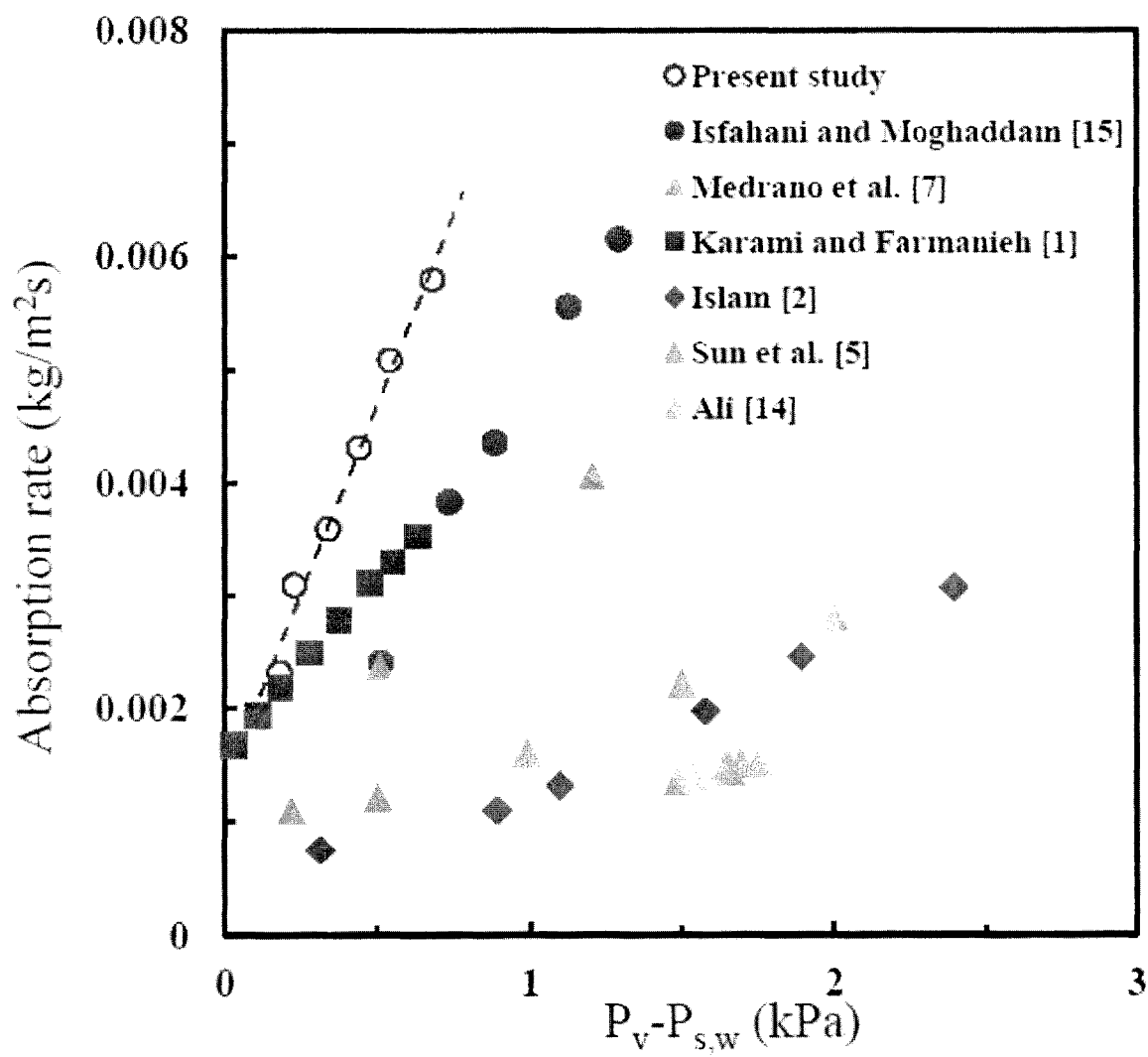
FIG. 6 shows a plot of absorption rate as a function of water vapor pressure potential for the absorber, according to an embodiment of the invention, and comparative data from Isfahani and Moghaddam; Ali, *Appl Energy*, 2010, 87,1112-21; Medrano et al., *Int J Therm Sci* 2002, 41, 891-8; Sun et al., *Appl Therm Eng*, 2010, 30, 2753-62; Islam, *Appl Therm Eng*, 2008, 28, 1386-94; and Karami and Farhanieh, *Heat Mass Transf*, 2009, 46, 197-207.

The driving force for the absorption process is the difference between the water vapor pressure over the LiBr solution ($P_{s,w}$) and the pressure of the absorber vapor phase ($P_v$). Any change in temperature and concentration of the solution phase results in changes in the pressure potential and the absorption rate. FIG. 6 presents variations of the absorption rate as a function of pressure potential for the absorber, according to an embodiment of the invention, as well as literature values for membrane-based, vertical tube, horizontal tube and vertical wall absorber configurations. The solution water vapor pressure used in the calculation ($P_{s,w}$) is the average of the solution water vapor pressure calculated using the corresponding solution temperature and concentration at the absorber inlet and exit. The water vapor pressure in the vapor phase ($P_v$) is the measured vapor pressure. The absorption rate achieved is significantly higher than that of prior art absorbers at a substantially lower pressure potential and solution flow rate.

Figure 7:
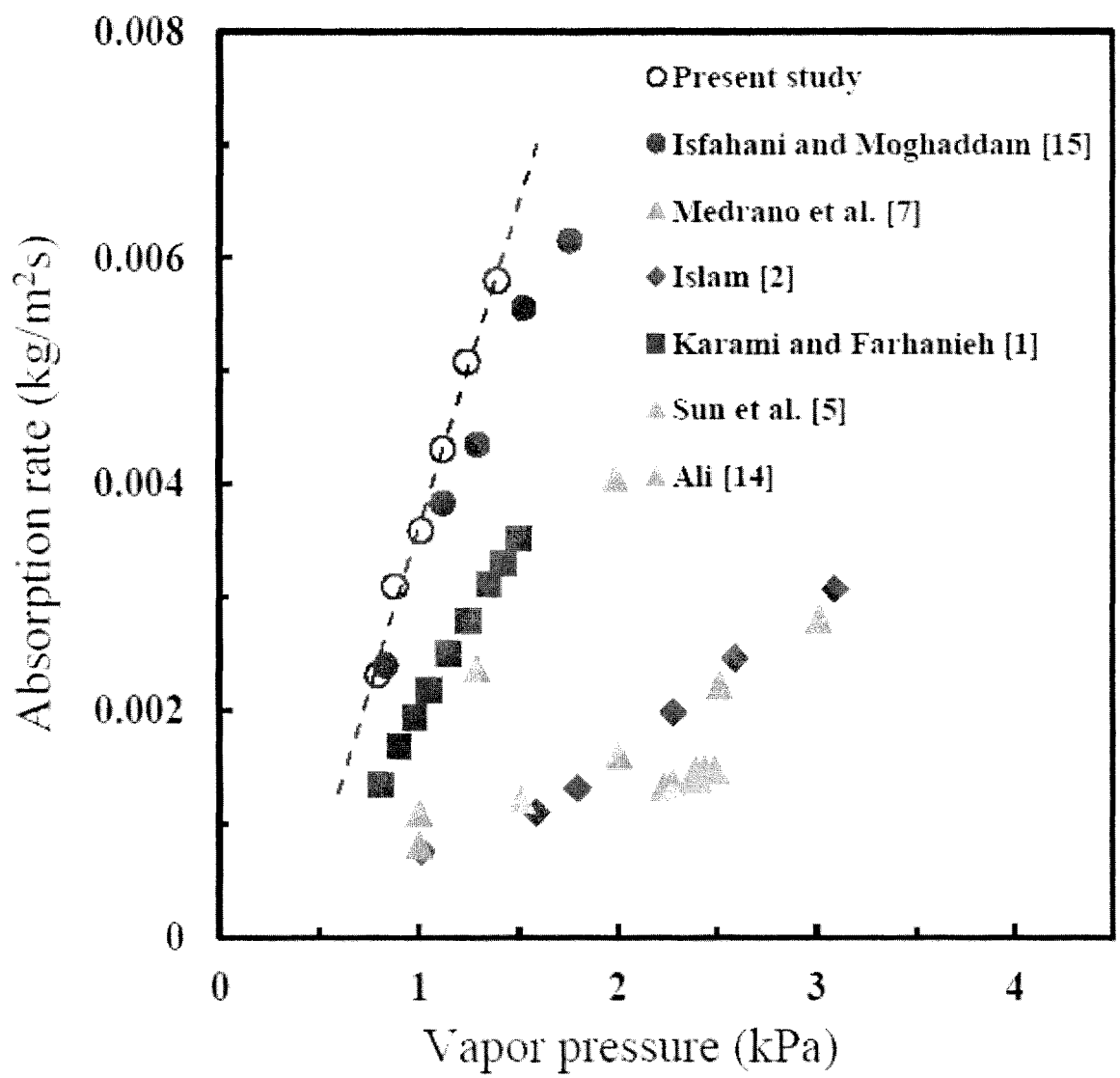
FIG. 7 shows a plot of the absorption rate as a function of water vapor pressure for the absorber, according to an embodiment of the invention, and comparative data from Isfahani and Moghaddam; Ali; Sun et al.; Medrano et al.; Islam; and Karami and Farhanieh.

The absorber's absorption rate dependence on the vapor pressure is shown in FIG. 7 over a range from 0.8 kPa to 1.4 kPa. Vapor pressure inside the absorber increases with the evaporator temperature. Other test parameters were kept constant at the nominal values listed in Table 1. Absorption rate increases almost linearly with the vapor pressure. As the vapor pressure inside the absorber increases, the equilibrium concentration of water at the interface increases, which leads to higher mass transfer driving potential and absorption rate. A 2.5-fold increase in the absorption rate is observed over the pressure range examined.

Figure 8:
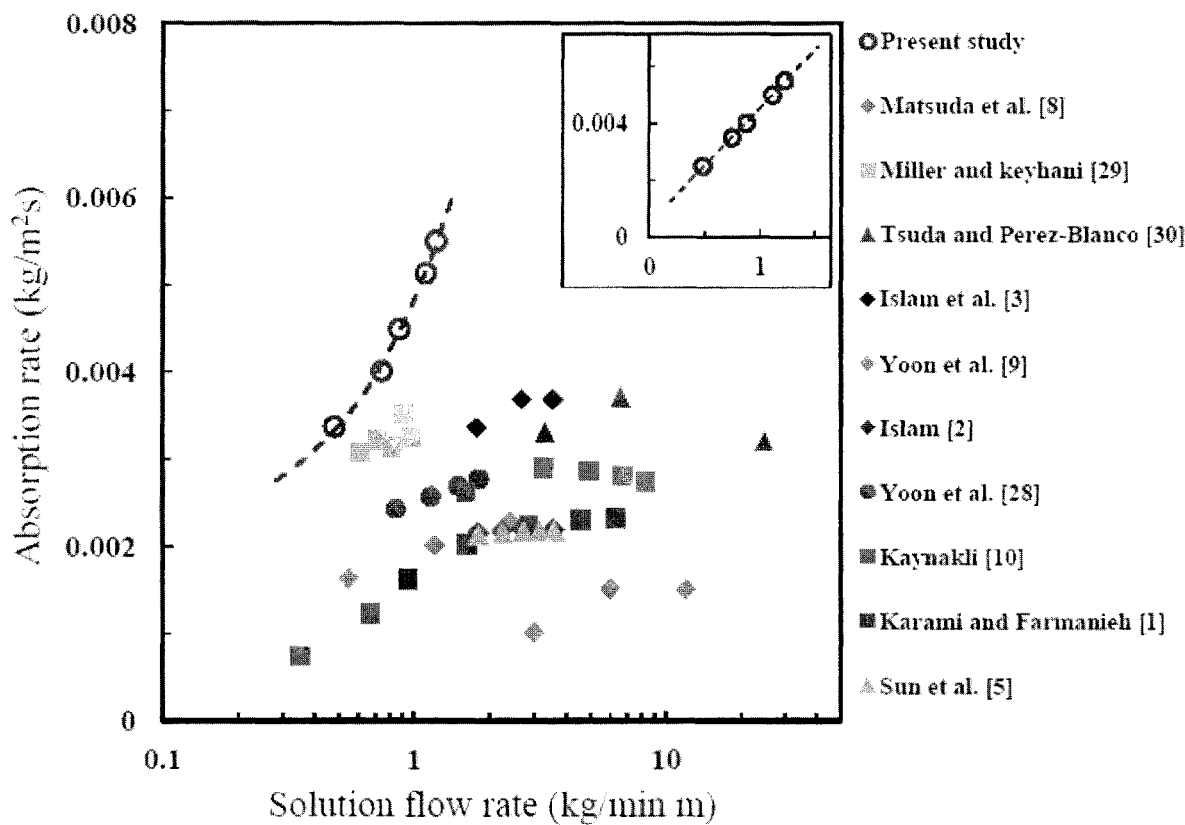
FIG. 8 shows a plot of absorption rate as a function of flow rate for the absorber, according to an embodiment of the invention, and comparative data from Islam; Sun et al., Karami and Farhanieh; Kaynakli, *Energy*, 2008, 33, 804-16; Yoon et al., *Appl Therm Eng*, 2006, 26,186-92; Islam et al., *Int J Refrig*, 2003, 26, 909-17; Yoon et al., *Heat Mass Transf*, 2007, 44, 437-44, Miller and Keyhani, *J Sol Energy Eng*, 2001, 123, 30; Tsuda and Perez-Blanco, *Int J Heat Mass Transf*, 2001, 44, 4087-94; Kaynakli, *Energy*, 2008, 33, 804-16; and Matsuda et al., *Int J Refrig*, 1994, 17, 538-42, and where the inset figure presents the current data on a linear scale.
Figure 9:
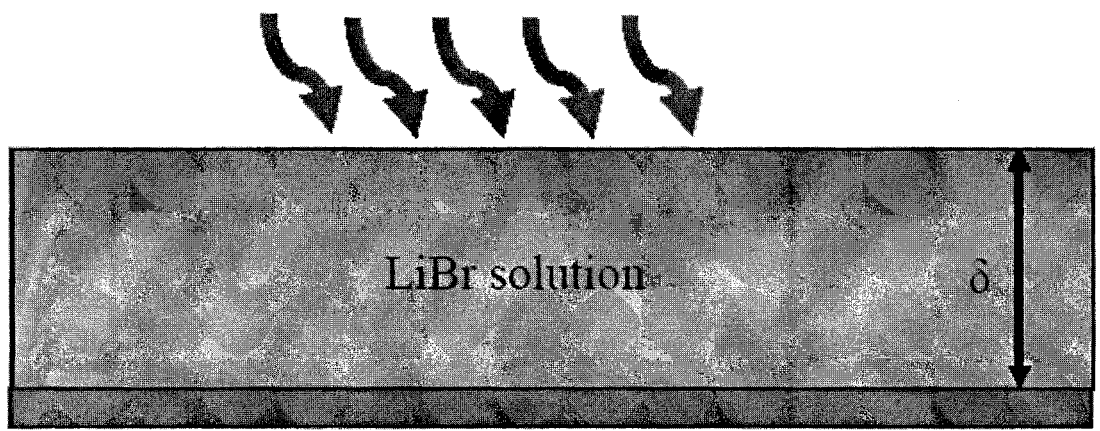
FIG. 9 shows an illustration of the temperature gradient established within a solution film due to heat release at the vapor-solution interface of an absorber.

The solution flow rate impacts the absorption and the system performance. FIG. 8 shows the results of varying the flow rate from 0.44 to 1.22 kg/min m, all other parameters held at their nominal values, given in Table 1, below. The variation by the flow rate is significant in studies on other absorbers, as plotted in FIG. 8, where the abscissa is displayed on a logarithmic scale. As indicated by the inset figure that is plotted on a linear scale, absorption rate increases almost linearly with the solution flow rate. The absorption rate in absorbers of alternate designs is low at low solution flow rates because of non-uniformity of the solution film where dry regions do not participate in the absorption process. The absorption rate increases with the solution flow rate until the surface is fully wetted where it plateaus.

The reasons for a steady increase in the absorption rate can be considered by the analysis of the solution flow thermohydraulics. As the solution flow rate increases, the solution film thickness and the solution average velocity increases. Thermal resistance at the solution-vapor interface occurs, where the water vapor heat of condensation is released and the cooling surface is a function of d/k, where d is the solution film thickness and k is the solution thermal conductivity. By increasing the solution film thickness the thermal resistance increases, inhibiting cooling of the solution-vapor interface resulting in higher water pressure in the solution phase. A higher water pressure decreases the pressure potential and the absorption rate. On the other hand, as the flow rate increases, the solution inside the absorber is replenished faster with the concentrated solution, which leads to an increase in the pressure potential and consequently in the absorption rate. Since the film thickness range in the current study is only a few hundred microns, the thermal resistance does not significantly impact the absorption process. As a result, the effect of solution velocity increase on the absorption rate is dominant and the absorption rate increases with the flow rate within the range examined.

Figure 10:
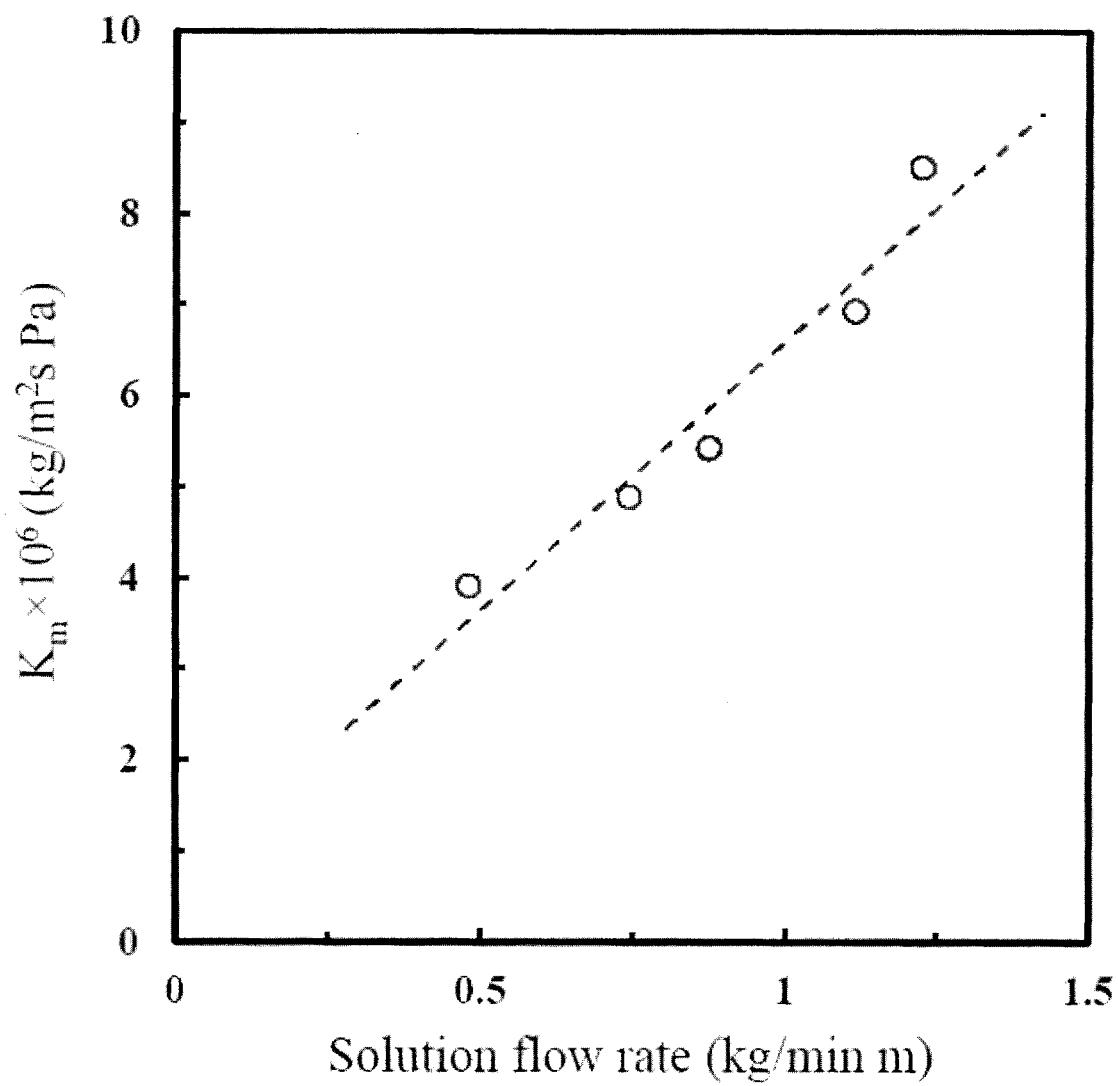
FIG. 10 is a plot of the absorption coefficient as a function of solution flow rate in the absorber, according to an embodiment of the invention.
Figure 11:
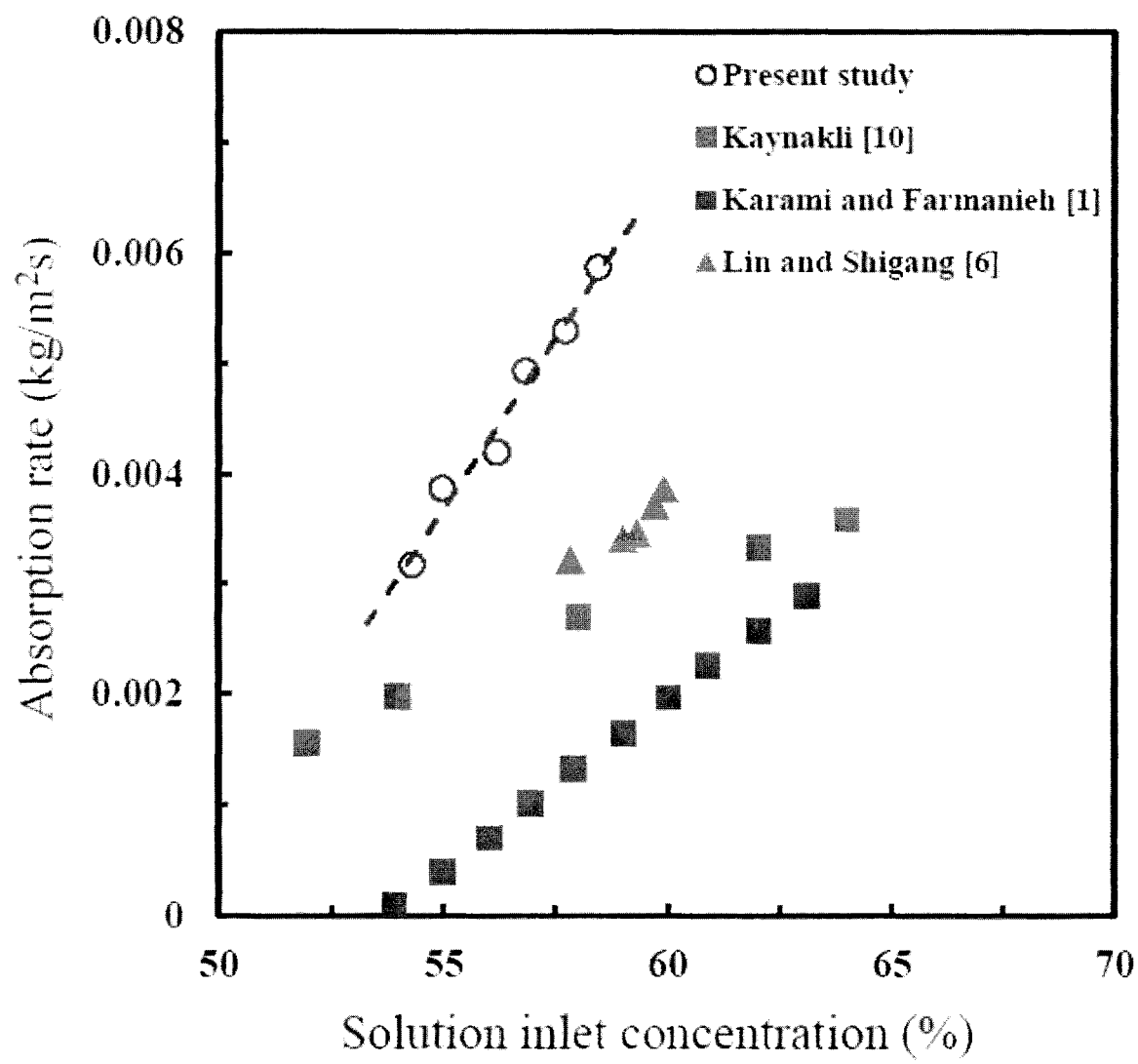
FIG. 11 shows a plot of the absorption rate as a function of the concentration of the inlet solution for the absorber, according to an embodiment of the invention, and comparative data from Kaynakli; Karami and Farhanieh; and Lin and Shigang, *Appl Therm Eng*, 2011, 31, 2850-4.

Increasing the solution flow rate changes the solution exit condition, which affects the average solution water vapor pressure and, consequently, the available pressure potential changes. In order to isolate the effect of solution flow rate changes on the absorption coefficient, Km, which is the absorption rate divided by the pressure potential, the pressure potential for each data point is achieved by subtracting the average solution water pressure between the inlet and exit flows from the absorber vapor pressure. As shown in FIG. 10, the absorption coefficient linearly increases with the solution flow rate. This is consistent with an enhancement in the absorption rate due to heat and mass transfer enhancement within the solution film. The effect of solution inlet concentration on the absorption rate is shown in FIG. 11. The absorption rate linearly increases with the solution inlet concentration. As the solution concentration increases, the solution water vapor pressure decreases, and, therefore, the pressure potential and the absorption rate increase. However, operation of the system at higher concentrations requires more control measures, since it increases the risk of LiBr crystallization, when the solubility limit of LiBr in the solution is exceeded.

Figure 12:
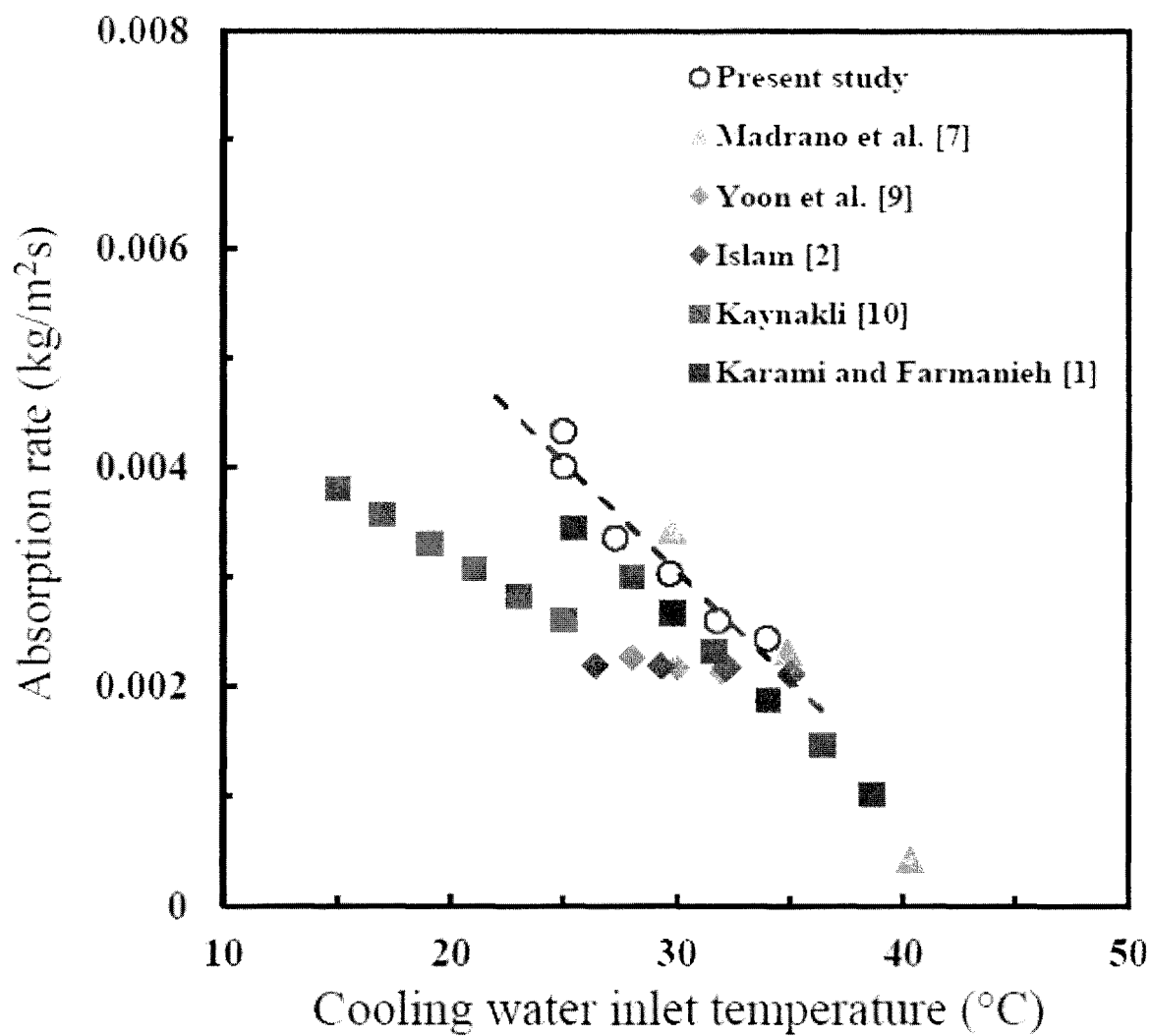
FIG. 12 shows a plot of the absorption rate as a function of the cooling water inlet temperature for the absorber, according to an embodiment of the invention, and comparative data from Medrano et al.; Yoon et al., 2006; Islam; Kaynakli; and Karami and Farhanieh.

The absorption rate decreases linearly with increasing cooling water inlet temperature, as shown in FIG. 12. Higher cooling water temperature increases the bulk solution temperature, which results in greater solution vapor pressures that reduce the pressure potential and consequently the absorption rate. Absorption rate decreases by 45% as the cooling water temperature increases from 30° C. to 37.5° C.

Figure 13:
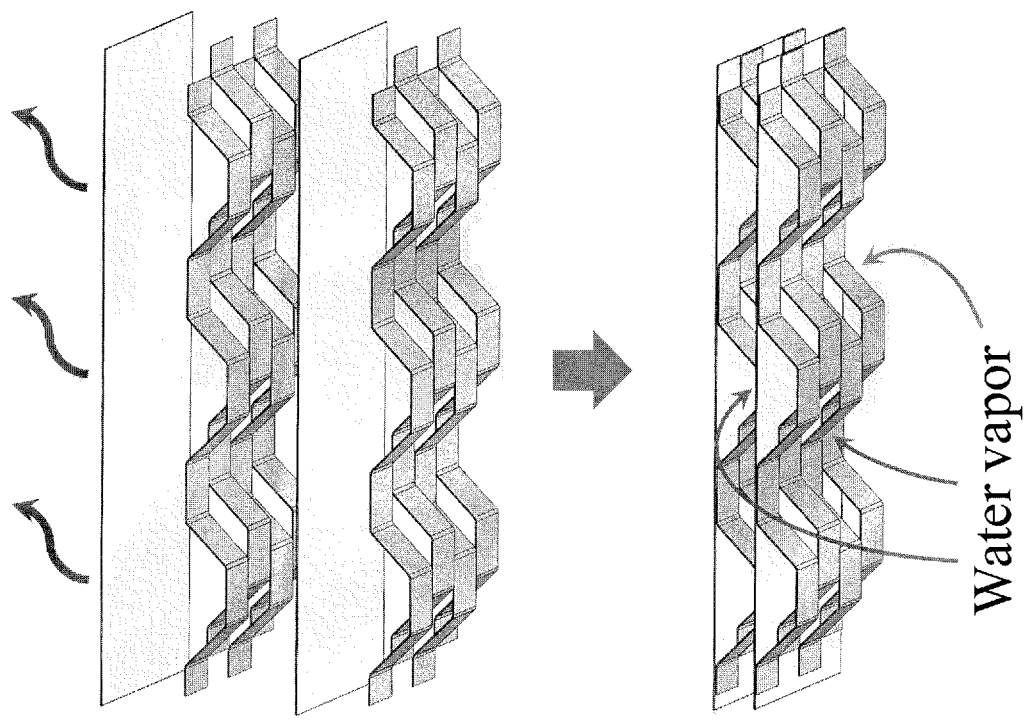
FIG. 13 shows an illustration for the construction of a multilayer absorber, according to an embodiment of the invention.

To further increase absorption rates and capacity, in an embodiment of the invention, the absorber can be multilayer, as shown in FIG. 13 for two layers. In the multilayer absorber, solution drains on a plurality of plates where the fin structure of one absorbing plate supports the next supporting plate. Absorption occurs as the heat is lost from one plate is transferred through the fin structure to the plate of the adjacent layer. The structure requires that the water vapor atmosphere can access solution on all layers of the absorber.

Figure 14:
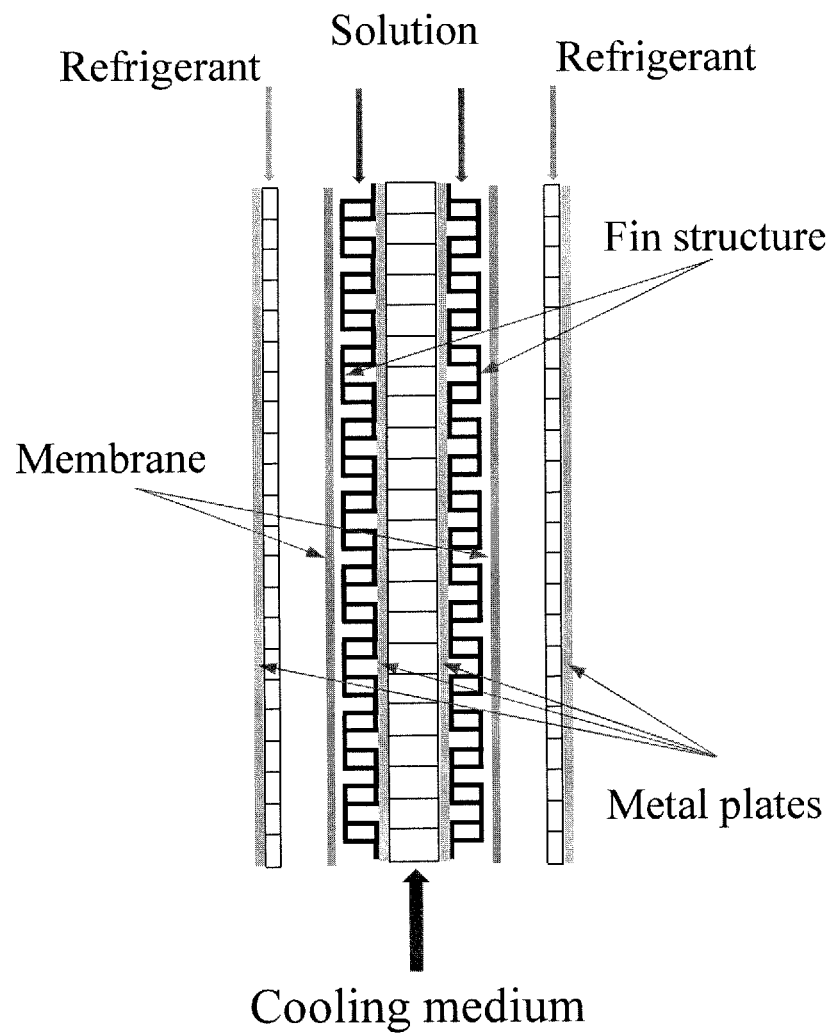
FIG. 14 shows a drawing of a combined evaporator-absorber, according to an embodiment of the invention.

In an embodiment of the invention, the absorber is combined with the evaporator into a compact unit of very high efficiency. As illustrated in FIG. 14, the compact unit includes two fin decorated absorber surfaces that are separated by membranes from vapor space between the evaporator surface, from which refrigerant vapor is drawn from a thin film of falling refrigerant on a heat exchanging metal plate, and the concentrated solution flowing down the fins of the absorber, according to an embodiment of the invention. The membranes are hydrophobic membranes such as a polytetrafluoroethlyene (PTFE) membrane where the membrane pore size for an absorber application is less than 1 μm, where the membrane posses a favorable vapor flow through the membrane pores. Membranes that are appropriate for the combined evaporator absorber are taught in Moghaddam et al., "3D Microstructures for Rapid Absorption/Desorption in Mechanically Constrained Liquid Absorbents", International Application Pub. No. WO/2015/103199; Moghaddam et al., "Hierarchical Hydrophilic/Hydrophobic Micro/Nanostructures for Pushing the Limits of Critical Heat Flux", International Application Pub. No. WO/2015/095356; and Moghaddam et al., "Thin Film-Based Compact Absorption Cooling System", International Application Pub. No. WO/2013/063210. Moghaddam et al., "Architecture for Absorption Based Heaters", International Application No. PCT/US2015/033745, which are incorporated by reference herein. In this combined evaporator-absorber, as shown in FIG. 14, the refrigerant and the solution fall by the force of gravity in parallel films with the absorber surfaces being cooled by a cooling medium that is pumped through the conduit defined by the absorber plates with the coolant medium being pumped against gravity and counter to the concentrated solution flow. In this manner, the heat from the ambient air can be absorbed for vaporizing the refrigerant directly, if desired, or the exterior metal plates can be coupled with a conduit and fluid to distribute cooling to a volume remote from the site of evaporation.

Figure 15:
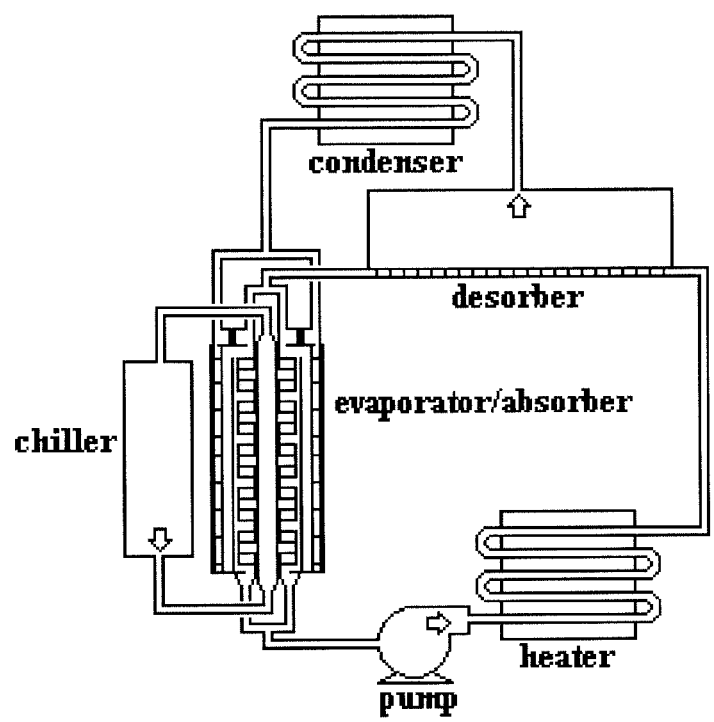
FIG. 15 shows a drawing of an absorption refrigeration system (ARS) according to an embodiment of the invention.

According to an embodiment of the invention, the combined evaporator-absorber module can be employed in an ARS, as shown in FIG. 15, according to an embodiment of the invention. The ARS as shown in FIG. 15 is for a loop where all refrigerant is absorbed in the concentrated solution, and no additional loop to transport unabsorbed refrigerant is shown, although the embodiment of the invention is not so limited. The ARS is illustrated with no valves, probes or filters, which can be included as desired or required. The heating of the dilute solution is shown, but need not be carried out with a heat exchanger, as available sources of heat or energy to provide heat can dictate the mode of heating the dilute solution before or at the desorber. The condenser is illustrated as a heat exchanger. The evaporator is illustrated as drawing its heat directly from ambient air; however, the surface that cools from ambient air can be remote to the evaporator and thermally contacted with an additional loop to a remote cooling surface.

METHODS AND MATERIALS

Figure 16A:
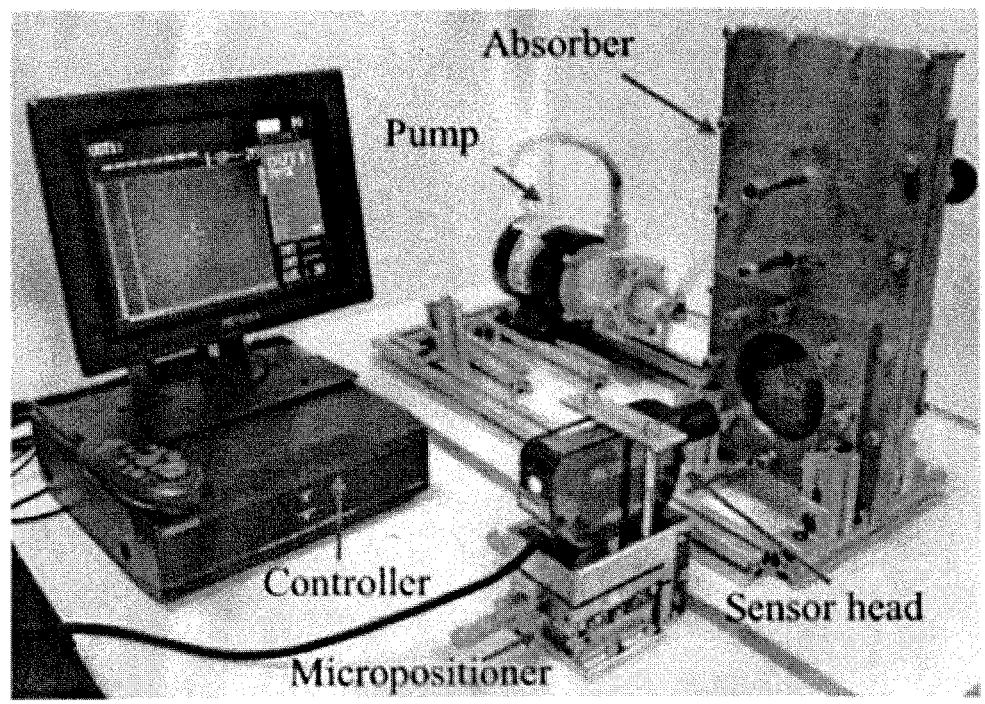
FIG. 16A shows a photograph of a test configuration for measuring solution film thickness for various solution flows.
Figure 16B:
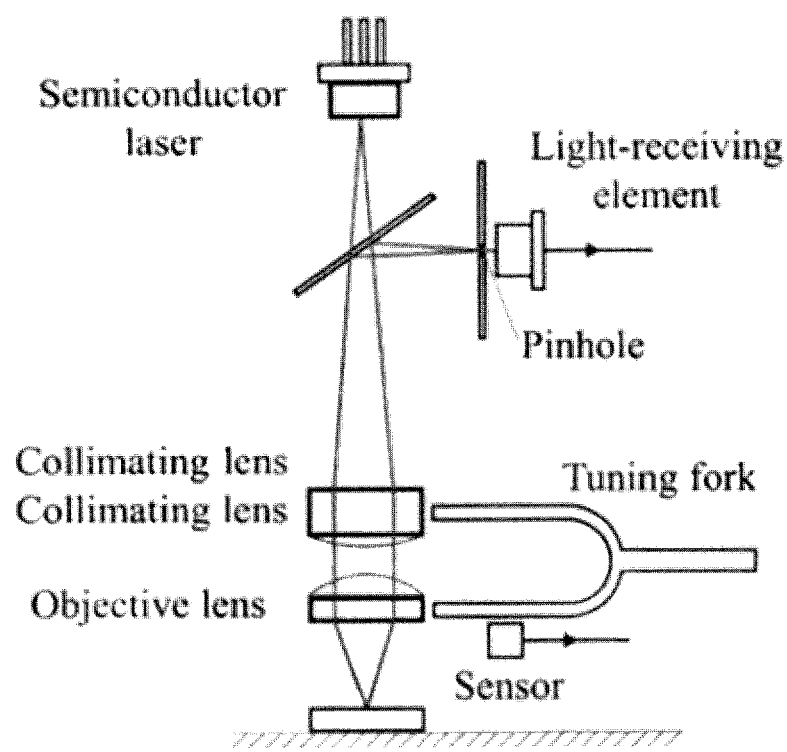
FIG. 16B is a diagram for the configuration of the device relative to the measured surface for laser confocal displacement determination.

To measure solution film thickness of the working absorber, a surface scanning laser confocal displacement meter (LT9030M, Keyence) was used. Flow patterns were measured for various contact angle surfaces at various flow rates with the absorber heat-exchanger with the lanced offset fin geometry, described above, with the confocal meter and absorber oriented as shown in FIG. 16A. The operation principle of the confocal displacement measurement method is illustrated in FIG. 16B, where the objective lens of the system is vibrated at high frequency by a tuning fork. The laser beam passes through the objective lens and is focused on the target solution film surface. The reflected beam is then directed through a pinhole to the light-receiving element. When the focus is obtained on the target surface, the light-receiving element detects the highest intensity. The position of the target surface can be determined by measuring the exact position of the objective lens. The resolution of the laser confocal displacement unit is 0.1 μm, and it is capable of measuring film thicknesses ranging from 50 μm up to 1 mm. The measurements were conducted over multiple points along a horizontal line between two consecutive fin rows, line AB of FIG. 3A, with the results averaged.

Figure 17A:
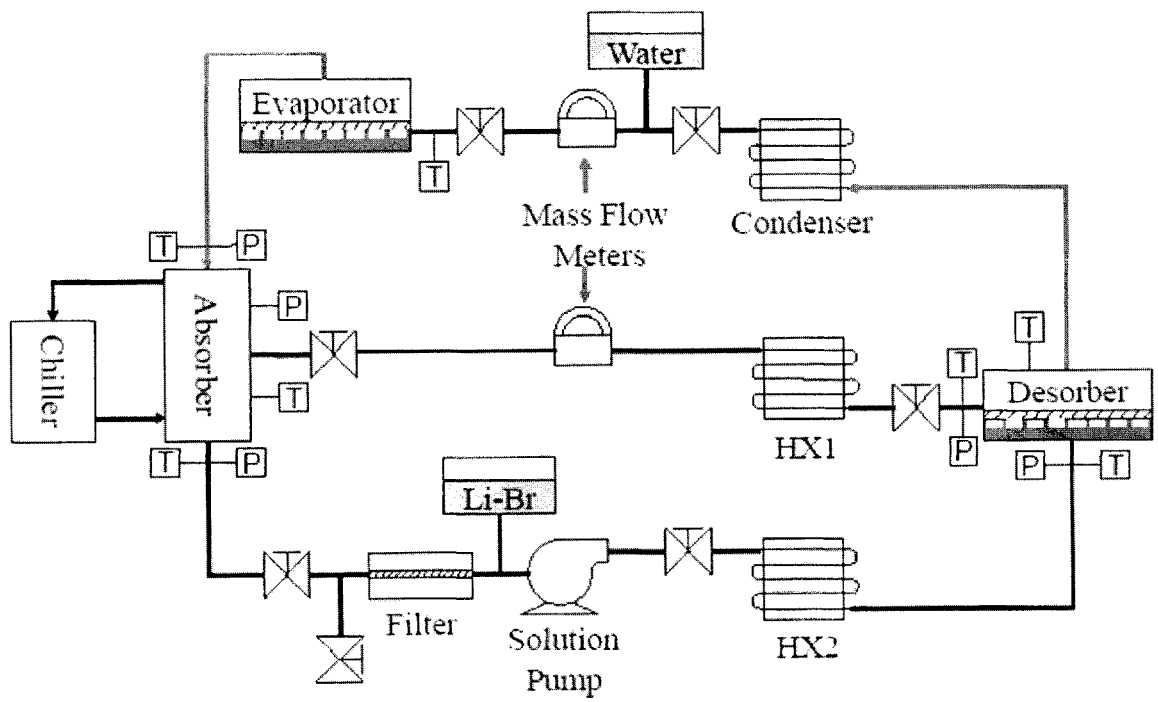
FIG. 17A shows a schematic diagram of the experimental ARS-like setup for establishing the working parameters and metrics capable for the absorber, according to an embodiment of the invention.

The research ARS, illustrated in FIG. 17A, allows the defining of parameters and determination of the effects of the parameters for the absorbers, according to an embodiment of the invention. Concentrated solution enters the absorber from an inlet port at the top of the absorber and dilute solution exits from an outlet port at the bottom of the absorber. Dilute solution from the absorber is drawn via a micro gear pump (HNP Mikrosysteme, Germany) through a filter into a preheater and subsequently a desorber, where heat is applied to the dilute solution by a thin film heater (Omega Engineering, CT), which results in desorption of water from the solution. The desorbed water vapor flows into a condenser. The concentrated solution from the desorber flows through a first heat exchanger where it is cooled to a preset temperature, and through a Coriolis mass flow meter (Bronkhorst USA). The concentrated solution is returned to the absorber and flows through the absorber where it comes in contact with the water vapor and absorption takes place.

The refrigerant line consists of the condenser and an evaporator, and also a flow meter (Micro Motion, CO) and a water reservoir. The water vapor from the desorber flows into the condenser where it liquefies. The condensed water passes through a flow meter and then into the evaporator. In the evaporator, the water is heated and evaporated using a flexible heater attached to the back wall of the evaporator. The water vapor flows into the absorber, where it is absorbed by the concentrated solution.

Figure 17B:
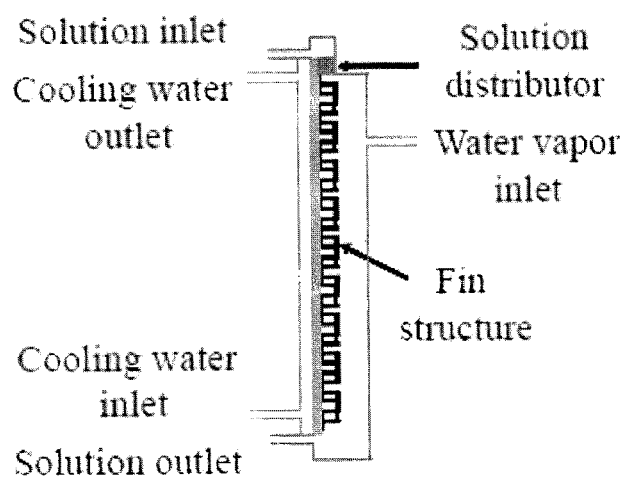
FIG. 17B shows the cross section of the absorber heat exchanger.

A schematic diagram of the absorber is shown in FIG. 17B. The concentrated solution enters the absorber from the top, passing through the solution distributer, and subsequently over the fin structure. The water vapor enters the absorber through its vapor inlet port and absorbs on the concentrated solution. The resulting dilute solution exits the absorber through the solution outlet port. A water chiller provides cooling water to an array of microchannels (4 mm wide and 0.4 mm deep) machined on the backside of the absorber for removal of the heat of absorption.

Lithium bromide solution (55% LiBr by weight) inhibited by lithium molybdate (LevertoneClarke Ltd, UK) and degassed deionized water were fed into the system from LiBr and water reservoirs, respectively. The pump was turned on and a desired flow rate was set. The water chiller was turned on, and the absorber cooling water temperature and flow rate were set. A valve, not shown in FIG. 16A, between the evaporator and absorber was opened to allow the absorption process to begin, with the concentrated solution's inlet temperature being adjusted via the heat exchanger from the desorber. Once the desired temperatures were achieved, the desorber and evaporator heaters were powered. Changes in temperatures, pressures and mass flow rates were monitored. The system was assumed to have reached steady state when variations in the absorber pressure and the solution density were less than 10 Pa and 5 kg/m$^3$ for at least 30 minutes. The absorption rate was determined from the refrigerant (water) line flow rate determined by the mass flow meter.

The range and uncertainty of the solution and refrigerant flow rates, pressure, density, and temperatures for this experimental study are summarized in Table 1, below.

TABLE 1

| Range and uncertainty of parameters. | | | | |
|---|---|---|---|---|
| Parameter | Nominal | Range | Error | Uncertainty |
| Solution flow rate | 0.55 kg/min m | 0.44-1.22 | ±0.008 | ±1.0% |
| Absorption rate | N.A | 40-120 g/h | ±0.8 | ±1.0% |
| Water vapor pressure | 1.2 kPa | 0.8-1.4 | ±5.5 Pa | ±0.5% |
| Inlet solution concentration | 57 wt % LiBr | 54-59 | ±0.17 | ±0.3% |
| Inlet solution density | 1627 kg/m$^3$ | 1570-1660 | ±5 | ±0.3% |
| Solution inlet temperature | 25° C. | 30-38 | ±0.3 | ±0.9% |
| Cooling water inlet temperature | 25° C. | 25-35 | ±0.3 | ±1.0% |

All patent applications and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. An absorber for an absorption refrigeration system and dehumidification of moist air, the absorber comprising at least one plate defining an active area and an array of fins disposed on a vertical surface of the at least one plate and having a distance between each fin that minimizes exertion of capillary forces on a cooling liquid disposed therebetween, the array of fins projecting perpendicularly from the vertical surface of the at least one plate, wherein the fins are spaced in a plurality of rows over the vertical surface of the at least one plate, the array of fins occupying at least a portion of a width of the active area of the vertical surface of the at least one plate, wherein each fin of the array of fins comprises a fin surface oriented perpendicular to the vertical surface of the at least one plate, and wherein ultimate and penultimate rows of the plurality of rows comprise fins that are offset by a fin lance length, whereby the array of fins are configured to distribute a falling liquid over the active area of the plate as a continuous thin falling film of the cooling liquid when the at least one plate is positioned vertically with the plurality of rows of fins being parallel to a base of the at least one plate.

2. The absorber according to claim 1, wherein each fin of the array of fins is rectangular in shape and extends from the vertical surface of the at least one plate.

3. The absorber according to claim 1, wherein the array of fins comprise an offset-strip fin array having a continuous surface comprising fins of an ultimate row projecting outward from the vertical surface with a continuing sheet being parallel to fins of an antepenultimate row projecting inward to the vertical surface.

4. An absorption refrigeration system, comprising an absorber according to claim 1.

5. The absorber according to claim 1, wherein a leading contact angle of a droplet of the cooling liquid when contacting the active area of the at least one plate is between 30° and 70°.

6. The absorber according to claim 1, wherein the active area of the vertical plate comprises a hydrophilic surface.

7. The absorber according to claim 6, wherein the hydrophilic surface is an oxidized and hydroxylized metal surface or a plastic surface.

8. A combined evaporator-absorber module, comprising at least one absorber according to claim 1 and at least one evaporator, wherein the evaporator comprises an evaporation plate for heat transfer and distribution of a refrigerant residing parallel to the plate of the absorber, and wherein a porous hydrophobic membrane separates the absorber and the evaporator.

9. The combined evaporator-absorber module of claim 8, wherein two absorbers contact a common cooling conduit and the absorbers and cooling conduit are situated between two evaporators.

10. An absorption refrigeration system, comprising a combined evaporator-absorber module according to claim 8.

11. An absorber comprising:
an absorber plate; and
a plurality of fins disposed on and extending from a vertical surface of the absorber plate, wherein
the plurality of fins are positioned on the vertical surface in a plurality of rows,
the plurality of fins occupy at least a portion of the width of an active area of the absorber plate,
each fin of the plurality of fins is spaced from the other fins such that capillary forces are not exerted on a cooling liquid disposed within the active area,
each fin of the plurality of fins comprising a fin surface positioned perpendicular to the vertical surface,
ultimate and penultimate rows of the plurality of fins comprise fins that are offset from the other rows of the plurality of rows of fins by a lance length of the fins, and
the plurality of fins are configured to distribute a liquid over the active area of the plate as a continuous thin film of liquid when the one or more plates are positioned vertically with the parallel rows of fins parallel to a base of the one or more plates.

12. The absorber according to claim 11, wherein the fins are rectangular in shape, extending from the plate's surface.

13. The absorber according to claim 11, wherein the fins comprise an offset-strip fin array having a continuous surface comprising the fins of an ultimate row projecting outward from the vertical surface with a continuing parallel sheet to the fins of an antepenultimate row projecting inward to the vertical surface.

14. An absorption refrigeration system, comprising an absorber according to claim 11.

15. The absorber according to claim 11, wherein the active area of the plate is a hydrophilic surface.

16. The absorber according to claim 15, wherein the hydrophilic surface is an oxidized and hydroxylized metal surface or a plastic surface.

17. A combined evaporator-absorber module, comprising at least one absorber according to claim 11 and at least one evaporator, wherein the evaporator comprises an evaporation plate for heat transfer and distribution of a refrigerant residing parallel to the plate of the absorber, and wherein a porous hydrophobic membrane separates the absorber and the evaporator.

18. The combined evaporator-absorber module of claim 17, wherein two absorbers contact a common cooling conduit and the absorbers and cooling conduit are situated between two evaporators.

19. An absorption refrigeration system, comprising a combined evaporator-absorber module according to claim 17.

20. An absorber comprising:
at least one plate comprising a vertical surface and defining an active area on the vertical surface; and
an array of fins disposed on the vertical surface of the at least one plate and having a distance between each fin, the array of fins projecting perpendicularly from the vertical surface of the at least one plate, wherein
the fins are uniformly spaced in a plurality of parallel rows over the vertical surface of the at least one plate, the array of fins occupying at least a portion of a width of the active area of the vertical surface of the at least one plate,
each fin of the array of fins comprises a fin surface oriented perpendicular to the vertical surface of the at least one plate,
ultimate and penultimate rows of the plurality of parallel rows comprise fins are offset by a fin lance length, and
the array of fins are configured to distribute a falling liquid over the active area of the plate as a continuous thin falling film of the cooling liquid when the at least one plate is positioned vertically with the plurality of parallel rows of fins being parallel to a base of the at least one plate and when said distance between each fin is selected to cause wetting of the array of fins by the cooling liquid but to prevent exertion of capillary forces sufficient to disrupt flow characteristics of the continuous thin falling film of the cooling liquid.

* * * * *

UNITED STATES PATENT AND TRADEMARK OFFICE
CERTIFICATE OF CORRECTION

PATENT NO. : 10,677,501 B2
APPLICATION NO. : 15/762333
DATED : June 9, 2020
INVENTOR(S) : Moghaddam et al.

It is certified that error appears in the above-identified patent and that said Letters Patent is hereby corrected as shown below:

On the Title Page

"(54) COMPONENT AND EFFICIENT PLATE AND FRAME ABSORBER" should read --(54) COMPACT AND EFFICIENT PLATE AND FRAME ABSORBER--

Signed and Sealed this
Twenty-ninth Day of September, 2020

Andrei Iancu
*Director of the United States Patent and Trademark Office*